United States Patent
Moon et al.

(10) Patent No.: US 7,317,708 B2
(45) Date of Patent: Jan. 8, 2008

(54) APPARATUS AND METHOD FOR PROVIDING INDOOR AND OUTDOOR WIRELESS ACCESS IN BROADBAND WIRELESS ACCESS COMMUNICATION SYSTEM

(75) Inventors: Sang-Jun Moon, Yongin-si (KR); Sung-Won Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 11/245,599

(22) Filed: Oct. 7, 2005

(65) Prior Publication Data

US 2006/0098614 A1    May 11, 2006

(30) Foreign Application Priority Data

Oct. 7, 2004   (KR) .................... 10-2004-0079891

(51) Int. Cl.
*H04Q 7/20* (2006.01)
*H04Q 7/38* (2006.01)

(52) U.S. Cl. .................. 370/331; 370/329; 370/328; 370/395.1; 370/389; 370/401; 370/310; 370/343; 455/410; 455/411; 455/436; 455/426.1; 455/426.2; 455/437; 455/438; 709/227; 709/228; 709/230; 709/238

(58) Field of Classification Search ............... 370/331, 370/329, 328, 310, 338, 343, 401, 395.1, 370/389; 455/410, 411, 436, 437, 438, 439, 455/440, 441, 442, 443, 444, 422.1, 403, 455/445, 500, 517, 426.1, 426.2; 709/227, 709/228, 230, 238

See application file for complete search history.

(56) References Cited

U.S. PATENT DOCUMENTS

| 2005/0089052 A1* | 4/2005 | Chen et al. ................. 370/401 |
| 2005/0144237 A1* | 6/2005 | Heredia et al. ............. 709/206 |
| 2005/0174974 A1* | 8/2005 | Sonntag et al. ............. 370/338 |

* cited by examiner

*Primary Examiner*—Keith Ferguson
(74) *Attorney, Agent, or Firm*—The Farrell Law Firm, PC

(57) ABSTRACT

Disclosed is a method and apparatus for providing wireless access in a broadband wireless access system. The apparatus authenticates an access terminal when an access of the access terminal located in a first network employing a first predetermined access scheme is detected, allocates a private Internet Protocol (IP) address to the authenticated access terminal, translates the private IP address into a public IP address when an access of the access terminal through the private IP address is detected, and controls that the access terminal accesses a second network employing a second predetermined access scheme through the public IP address.

24 Claims, 9 Drawing Sheets

APPARATUS AND METHOD FOR PROVIDING INDOOR AND OUTDOOR WIRELESS ACCESS IN BROADBAND WIRELESS ACCESS COMMUNICATION SYSTEM

PRIORITY

This application claims the benefit under 35 U.S.C. §119(a) of an application entitled "Apparatus And Method For Providing Indoor And Outdoor Wireless Access In Broadband Wireless Access Communication System" filed in the Korean Intellectual Property Office on Oct. 7, 2004 and assigned Serial No. 2004-79891, the contents of which are incorporated herein by reference.

BACKGROUND OF THE INVENTION

1. Field of the Invention

The present invention relates to a wireless access apparatus and method in a broadband wireless access (BWA) communication system, and more particularly to an apparatus and method for providing indoor local-area and outdoor wide-area wireless access.

2. Description of the Related Art

A wireless access communication system includes an access point (AP) in order to provide a wireless service. The access point wirelessly communicates with access terminals (ATs) so that access terminals located in a service coverage area of the access point can transmit and receive signals and connect to an external network.

Hereinafter, the configuration of a wireless fidelity (WiFi) system will be described with reference to FIG. 1 as an example of a wireless local area network (WLAN) system using an access point.

FIG. 1 is a block diagram schematically illustrating the configuration of a typical WiFi system.

A WiFi indoor network area 100, which is a WiFi area, includes an indoor network access terminal 115 and a WiFi access point 110. The WiFi access point 110 serves as a WLAN hub or bridge in the WiFi indoor network area 100. In addition, the WiFi access point 110 connected to an external network 120 operates as a WiFi bridge or router to connect the external network 120 and the WiFi indoor network area 100.

Generally, it is assumed that the WiFi access point 110 and the external network 120 are typically connected using a hard-wired connection. That is, there is a limitation in that the WiFi access point 110 providing only indoor local-area access wirelessly must be connected to a cable network providing outdoor wide-area access.

Recently, however, a broadband wireless access communication system, e.g., a Mobile Worldwide Interoperability for Microwave Access (WiMAX) system, capable of providing outdoor wide-area access as well as indoor local-area access, has been proposed. The Mobile WiMAX system can provide very-high-speed internet access at a low price without regard to time and location. For example, the Mobile WiMAX system can provide a very-high-speed Internet service to a laptop, a personal digital assistant (PDA) and the like which is located in a subway train traveling underground at 60 Km/hr.

Therefore, the development of a new wireless access method capable of providing not only wireless access in an indoor local area but also connection to an outdoor external network is desired.

SUMMARY OF THE INVENTION

Accordingly, the present invention has been made to solve the above-mentioned problems occurring in the prior art, and an object of the present invention is to provide a wireless access apparatus and method capable of providing outdoor wide-area wireless access as well as indoor local-area wireless access.

To accomplish this object, in accordance with one aspect of the present invention, there is provided an apparatus for providing wireless access in a broadband wireless access system which includes a first network employing a first predetermined access scheme and a second network employing a second predetermined access scheme, the apparatus including: a bridge for authenticating an access terminal when an access of the access terminal located in the first network is detected, allocating a private Internet Protocol (IP) address to the authenticated access terminal, translating the private IP address into a public IP address when an access of the access terminal through the private IP address is detected, and controlling that the access terminal accesses the second network through the public IP address.

In accordance with another aspect of the present invention, there is provided an apparatus for providing wireless access in a broadband wireless access system which includes a first network employing a first predetermined access scheme and a second network employing a second predetermined access scheme, the apparatus including: a bridge for controlling that an access terminal is authenticated by relaying between the access terminal and the second network when an access of the access terminal located in the first network is detected, controlling that the access terminal is allocated with a public Internet Protocol (IP) address from the second network by relaying between the authenticated access terminal and the second network, and switching the public IP address to enable the access terminal to access the second network when an access of the access terminal through the public IP address is detected.

In accordance with still another aspect of the present invention, there is provided a method for providing wireless access in a broadband wireless access system, the method including: authenticating an access terminal when an access of the access terminal located in a first network employing a first predetermined access scheme is detected; allocating a private Internet Protocol (IP) address to the authenticated access terminal; and translating the private IP address into a public IP address when an access of the access terminal through the private IP address is detected, and controlling that the access terminal accesses a second network employing a second predetermined access scheme through the public IP address.

In accordance with still another aspect of the present invention, there is provided a method for providing wireless access in a broadband wireless access system, the method including: controlling that an access terminal is authenticated by relaying between the access terminal and a second network employing a second predetermined access scheme, when an access of the access terminal located in a first network employing a first predetermined access scheme is detected; controlling that the access terminal is allocated with a public Internet Protocol (IP) address from the second network by relaying between the authenticated access terminal and the second network; and switching the public IP address to enable the access terminal to access the second network when an access of the access terminal through the public IP address is detected.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
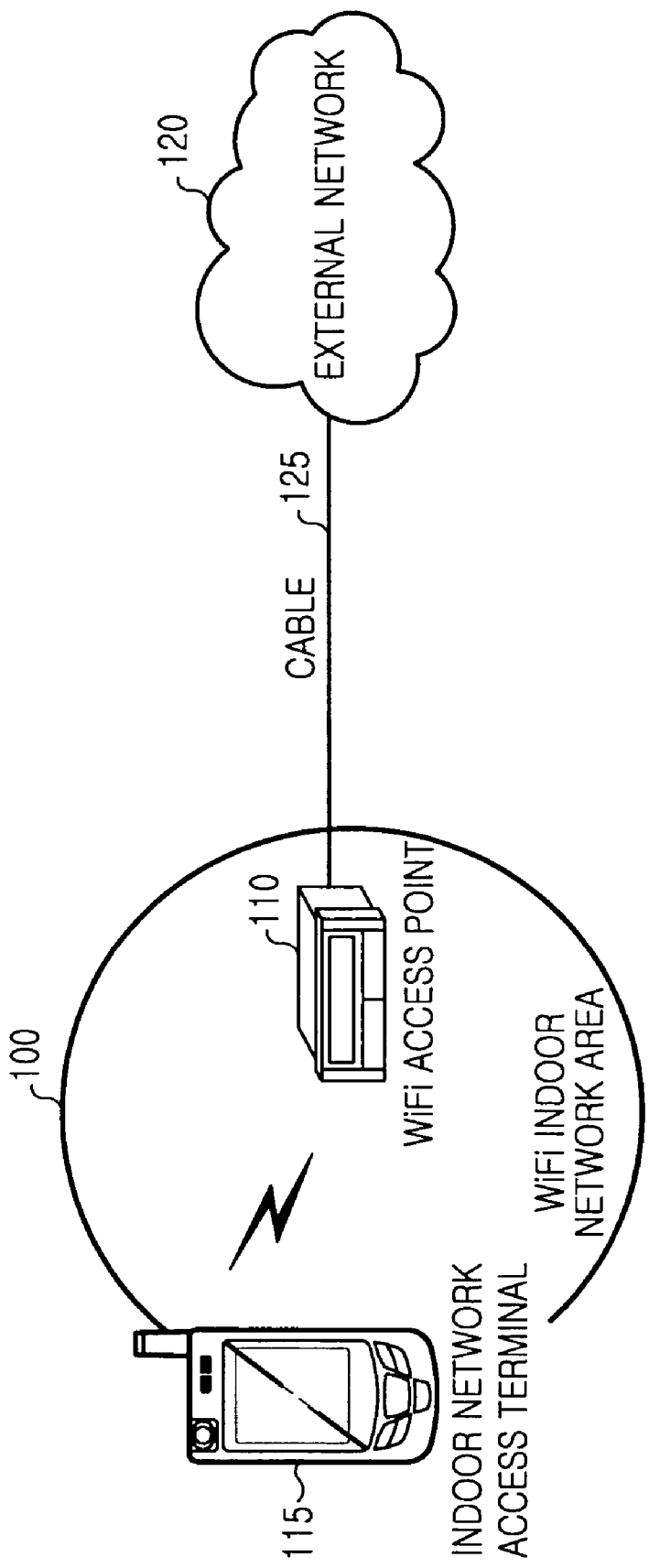
FIG. 1 is a block diagram schematically illustrating the configuration of a typical WiFi system.

Hereinafter, one preferred embodiment according to the present invention will be described with reference to the accompanying drawings. It is to be noted that the same elements are indicated with the same reference numerals throughout the drawings. In the following description of the embodiments of the present invention, a detailed description of known functions and configurations incorporated herein will be omitted when it may obscure the subject matter of the present invention.

The present invention proposes a wireless access apparatus and method in a broadband wireless access (BWA) communication system, such as a Mobile Worldwide Interoperability for Microwave Access (WiMAX) system. Particularly, the present invention discloses an apparatus and method for providing indoor local-area and outdoor wide-area wireless access in a Mobile WiMAX system. That is, the present invention proposes a Mobile WiMAX bridge apparatus which serves as an access point (AP) of a wireless local area network (WLAN) (e.g., a wireless fidelity (WiFi) system or Mobile WiMAX system) for an indoor network and which simultaneously serves as an access point (AP) of a Mobile WiMAX system for an outdoor network, and a method for the same. Although the Mobile WiMAX system is described herein as an example of the broadband wireless access communication system, it is obvious that the present invention can be applied to the other communication systems as well as the Mobile WiMAX system.

Figure 2:
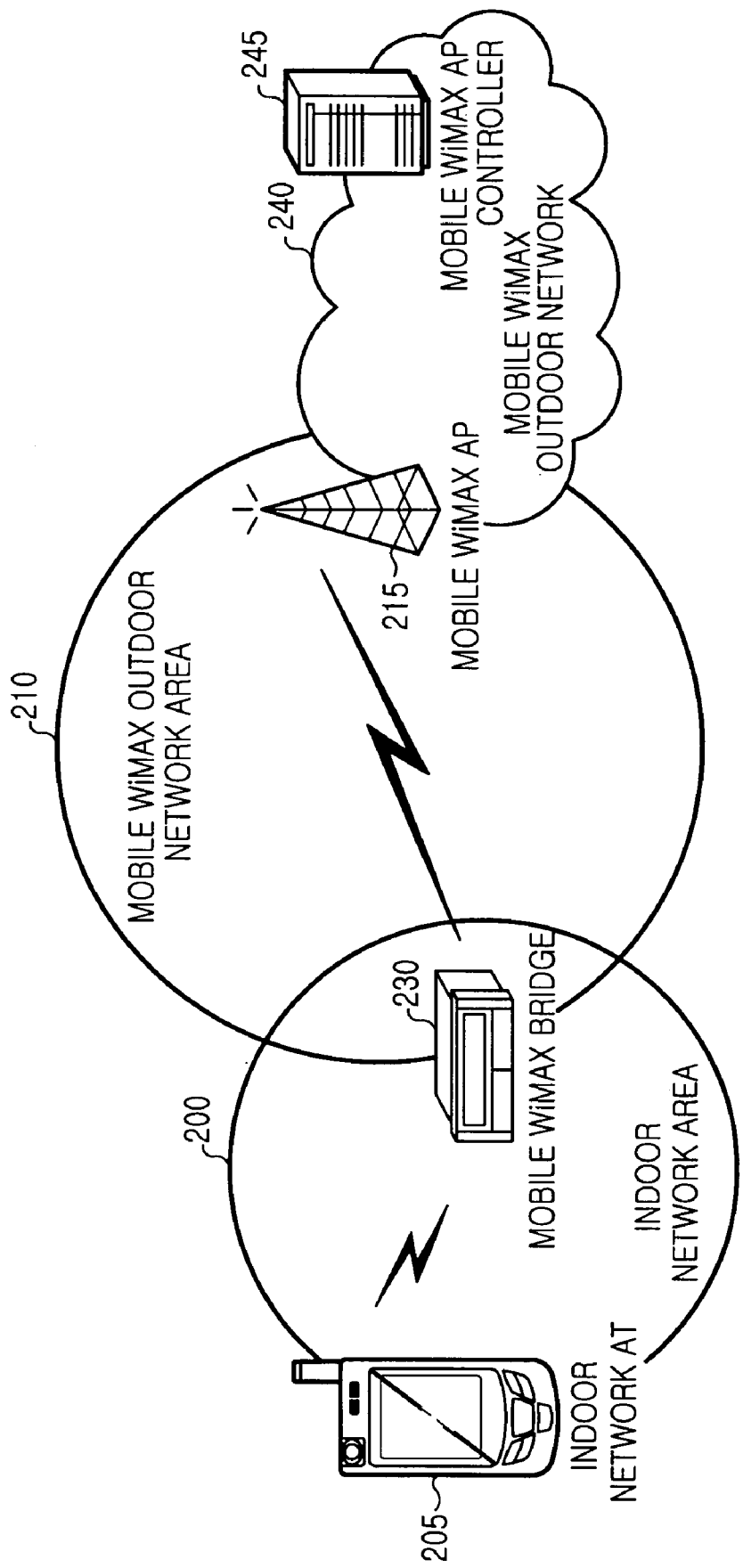
FIG. 2 is a block diagram schematically illustrating a configuration of an indoor network and an outdoor network connected to each other using a Mobile WiMAX bridge according to an embodiment of the present invention.

FIG. 2 is a block diagram schematically illustrating a configuration of an indoor network and an outdoor network connected to each other using a Mobile WiMAX bridge according to an embodiment of the present invention.

An indoor network area 200 includes an indoor network access terminal (AT) 205 and a Mobile WiMAX bridge 230. A Mobile WiMAX outdoor network area 210 includes a Mobile WiMAX access point 215, which can wirelessly access the Mobile WiMAX bridge 230. Herein, the Mobile WiMAX bridge 230 serves as an access point to be used for Mobile WiMAX access, and can be allocated with an outdoor network Internet Protocol (IP) of the Mobile WiMAX bridge 230 itself, according to necessity. It should be noted that the term "indoor network" for the sake of clarity has been used to denote a corresponding part of Mobile WiMAX network and does not have to be located "indoors". Similarly, the term Mobile WiMAX Outdoor Network denotes a corresponding part of a Mobile WiMAX Network which can be used indoors or out.

The internal configuration of the Mobile WiMAX bridge 230 will now be described with reference to FIG. 3.

Figure 3:
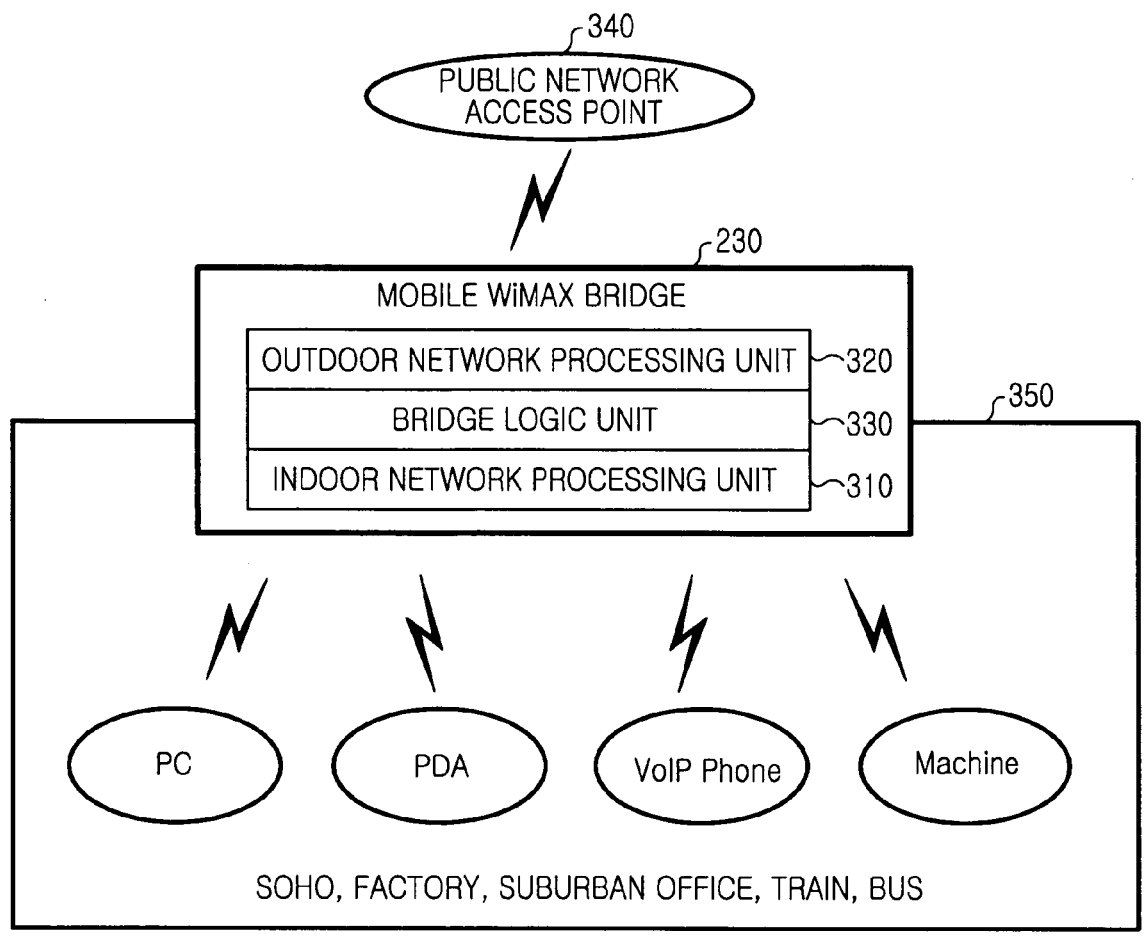
FIG. 3 is a block diagram schematically illustrating the internal configuration of the Mobile WiMAX bridge shown in FIG. 2.

FIG. 3 is a block diagram schematically illustrating the internal configuration of the Mobile WiMAX bridge 230 shown in FIG. 2.

The Mobile WiMAX bridge 230 includes an indoor network processing unit 310 in charge of WiFi access and Mobile WiMAX access for an indoor network, an outdoor network processing unit 320 in charge of Mobile WiMAX access for an outdoor network, and a bridge logic unit 330 for connecting the indoor network processing unit 310 with the outdoor network processing unit 320.

The indoor network processing unit 310 serves as an indoor low-power WiFi/Mobile WiMAX access point in a licensed/unlicensed MiFi/Mobile WiMAX frequency band to access ATs such as personal computers (PCs), personal digital assistants (PDAs), VoIP phones, wireless phones, and other like devices. The indoor network processing unit 310 may be installed in areas such as small office(s)/home office(s), (SOHOs), large office trains, buses, taxis, airplanes, and cars, commercial spaces such as malls, factories, stores, restaurants, etc., and other areas as desired.

In order to achieve WiFi access, the indoor network processing unit 310 provides a service corresponding to that provided in a WLAN system such as the conventional WiFi systems and provides a service corresponding to that provided in a Mobile WiMAX system.

The outdoor network processing unit 320 provides an outdoor high-power Mobile WiMAX access terminal's function of accessing an outdoor network by using a licensed Mobile WiMAX frequency band.

The bridge logic unit 330 connects the indoor network processing unit 310 and the outdoor network processing unit 320 to each other, and basically performs a layer 2 or 3 (L2/L3) function representing a medium access control (MAC) layer or an IP layer, a switch function, a security relevant function such as authentication and/or encryption, and a function relating to Quality of Service (QoS).

The bridge logic unit 330 performs different operations depending on whether the indoor network is a WiFi network, or is a Mobile WiMAX network, or is allocated with an IP address different from that of an outdoor network to form a private network independent of the outdoor network, or is a public network allocated with an IP address from an exterior.

The operations of the bridge logic unit 330 performed for the above cases are shown in Table 1 below.

TABLE 1

| Indoor Network | | Operations of bridge logic unit 330 |
|---|---|---|
| WiFi | private network | Dynamic Host Configuration Protocol (DHCP) server/Network Address Translation (NAT) functions, Correspond to WiFi QoS Mobile WiMAX |
| | public network | Correspond to WiFi authentication Mobile WiMAX, Correspond to WiFi QoS Mobile WiMAX |
| Mobile WiMAX | private network | DHCP server/NAT functions, Correspond to connection of indoor/outdoor network |
| | public network | Mobile WiMAX authentication relay, Correspond to connection of indoor/outdoor network |

Referring to Table 1, when a private network address is allocated for indoor network access and a network is configured independently of an external network, that is, when the indoor network is a private network, user authentication for the indoor network access terminal 205 is omitted or is completed by authentication for the Mobile WiMAX bridge 230. In this case, the Mobile WiMAX bridge 230 provides both of a DHCP server function and a NAT function.

Meanwhile, when the indoor network access terminal 205 is allocated with an IP address provided from an external network and receives authentication through the external network, that is, when the indoor network is a public network, the Mobile WiMAX bridge 230 transmits authentication and DHCP information transmitted from the indoor network access terminal 205 to the external network.

Hereinafter, wireless access service methods of the Mobile WiMAX bridge 230 in relation to the four cases shown in Table 1 will be described in detail.

Figure 4:
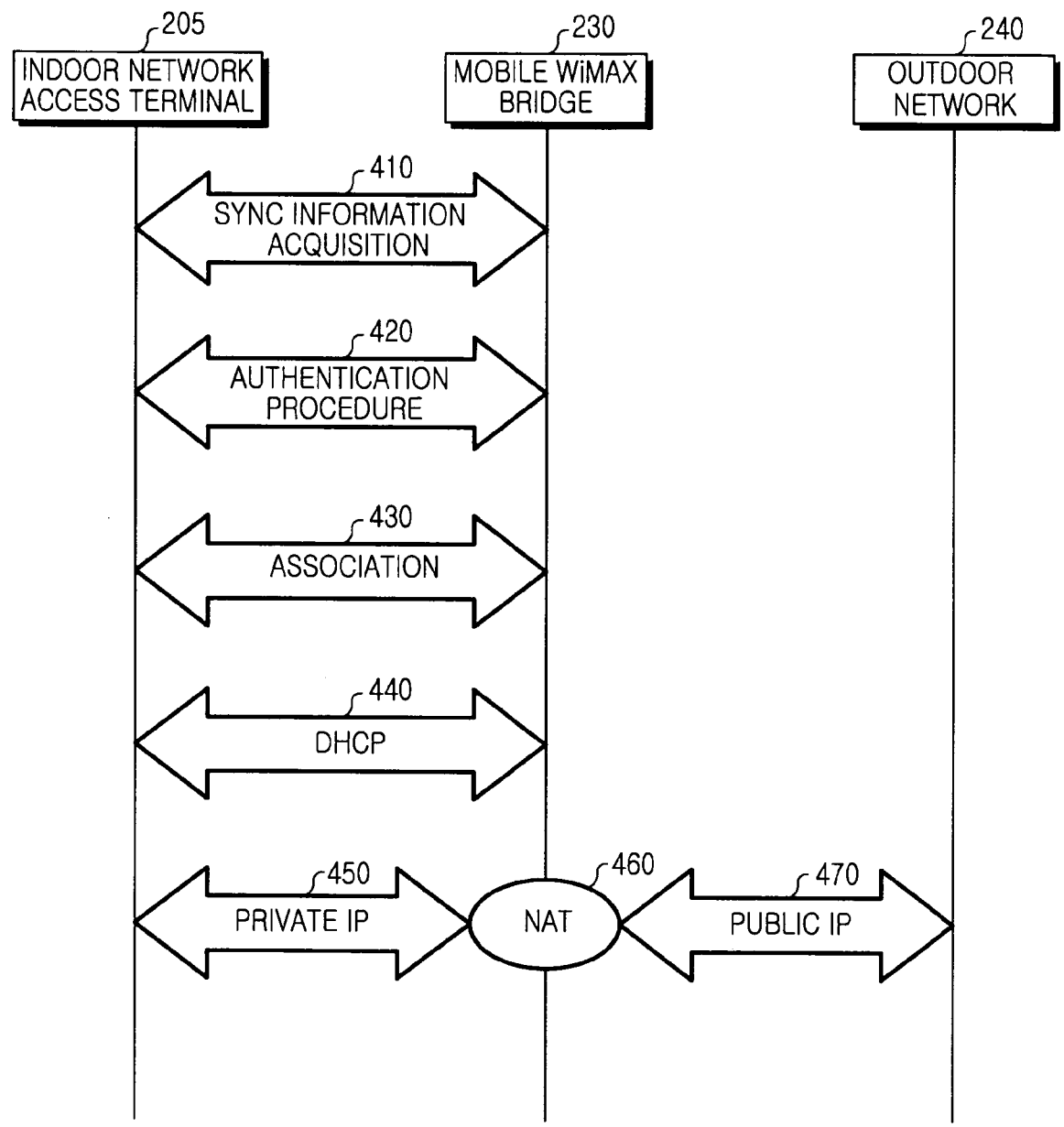
FIG. 4 is a flow diagram illustrating the wireless access service operation of the Mobile WiMAX bridge shown in FIG. 2 when a WiFi indoor private network is provided.

1. Indoor Network Constructed with WiFi Network 1-1. WiFi Indoor Private Network FIG. 4 is a signal flow diagram illustrating the wireless access service operation of the Mobile WiMAX bridge 230 shown in FIG. 2 when a WiFi indoor private network is provided.

In step 410, the indoor network access terminal 205 accesses the WiFi network by using synchronization information transmitted from the Mobile WiMAX bridge 230. In step 420, an authentication procedure between the indoor network access terminal 205 and the Mobile WiMAX bridge 230 is performed, which may be omitted, and then an association procedure is performed therebetween in step 430. In step 440, the indoor network access terminal 205 acquires a private IP address and required network configuration information through a DHCP from the Mobile WiMAX bridge 230. After this, when the indoor network access terminal 205 attempts to access an outdoor network through the Mobile WiMAX bridge 230 by means of the private IP address in step 450, the Mobile WiMAX bridge 230 performs a NAT function for translating the private IP address into a public IP address in step 460, and then performs access to the outdoor network 240 by using the translated public IP address in step 470. Herein, it is assumed that the Mobile WiMAX bridge 230 has performed an authentication procedure with respect to the outdoor network 240, and has been allocated with a public IP address in advance.

The operation of the above-mentioned Mobile WiMAX bridge 230 will now be described using a detailed example.

First, it is assumed that the Mobile WiMAX bridge 230 performs authentication of the outdoor network 240 in advance and then has been allocated with a public IP address such as, for example, 163.213.100.100. In this case, when the indoor network access terminal 205 requests allocation of a private IP address, the Mobile WiMAX bridge 230 allocates a private IP address (e.g., 192.168.10.10) to the indoor network access terminal 205 through a DHCP procedure. When an application program of the indoor network access terminal 205 generates a TCP/IP traffic packet from source port (e.g. 10000) to external server (e.g., 148.222.123.123) for port #80, the Mobile WiMAX bridge 230 performs a NAT function with respect to this TCP/IP traffic packet, translates it into source IP address 163.213.100.100 and source port 20000, and transmits the translated result to the external network. This may be simply expressed as shown in Table 2 below.

TABLE 2

| | Indoor network TCP/IP packet | | Outdoor network TCP/IP packet | |
|---|---|---|---|---|
| | Source | Destination | Source | Destination |
| Address Port number number | 192.168.10.10 10000 | 148.222.123.123 80 | 163.213.100.100 20000 | 148.222.123.123 80 |

Similarly, in a case of a packet of the external network targeting the IP address and port, the Mobile WiMAX bridge 230 translates the target IP address and port into the IP address and port of the indoor network access terminal 205 and transmits the packet to the indoor network access terminal 205. This also may be simply expressed as shown in Table 3 below.

TABLE 3

| | Outdoor network TCP/IP packet | | Indoor network TCP/IP packet | |
|---|---|---|---|---|
| | Source | Destination | Source | Destination |
| Address Port number | 148.222.123.123 10000 | 163.213.100.100 80 | 148.222.123.123 20000 | 192.168.10.10 80 |

1-2. WiFi Indoor Public Network

Figure 5:
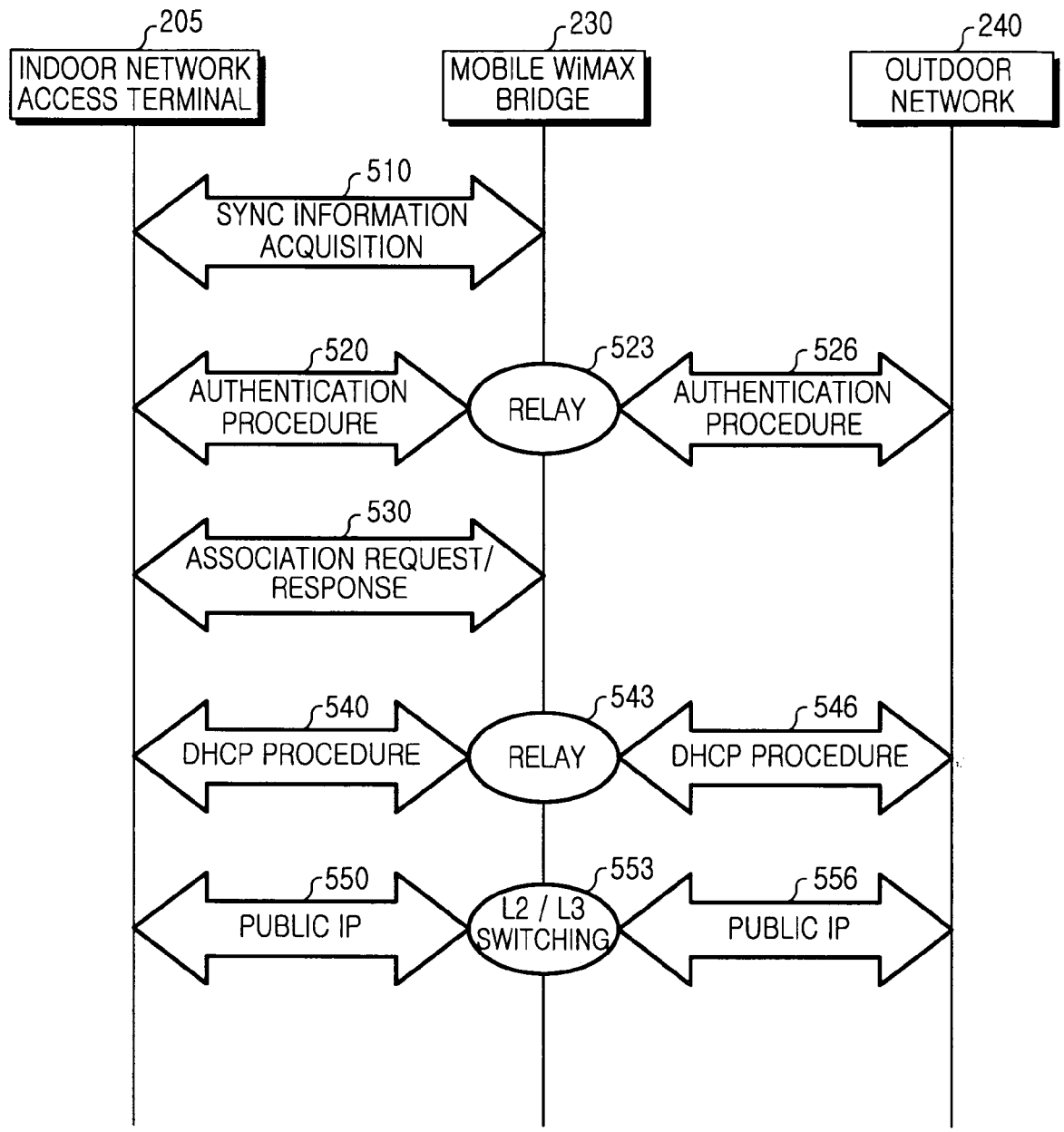
FIG. 5 is a flow diagram illustrating the wireless access service operation of the Mobile WiMAX bridge shown in FIG. 2 when a WiFi indoor public network is provided.

FIG. 5 is a flow diagram illustrating the wireless access service operation of the Mobile WiMAX bridge 230, shown in FIG. 2, when a WiFi indoor public network is provided.

In step 510, the indoor network access terminal 205 accesses the WiFi network by using synchronization information transmitted from the Mobile WiMAX bridge 230. An authentication procedure between the indoor network access terminal 205 and the Mobile WiMAX bridge 230 is performed in step 520, and the Mobile WiMAX bridge 230 performs a relay function to transmit a message relating to the authentication procedure between the indoor network access terminal 205 and an outdoor network in step 523. Since a WiFi authentication message has a different format from a Mobile WiMAX authentication message, the Mobile WiMAX bridge 230 performs only the function of transmitting a corresponding message to the outdoor network by using a general traffic connection identifier (CID). In step 526, an authentication procedure between the Mobile WiMAX bridge 230 and the outdoor network 240 is performed.

In step 530, an association procedure is performed between the indoor network access terminal 205 and the Mobile WiMAX bridge 230. In steps 540 to 546, the indoor network access terminal 205 acquires a public IP address and required network configuration information through a DHCP from the outdoor network 240. In this case, the Mobile WiMAX bridge 230 performs the function of relaying messages. After this, when the indoor network access terminal 205 attempts to access an outdoor network through the Mobile WiMAX bridge 230 by means of the public IP address in step 550, the Mobile WiMAX bridge 230 performs a L2/L3 switch function in step 553, and then performs access to an outdoor network 240 by using the public IP address in step 556. In this case, it is also assumed that the Mobile WiMAX bridge 230 has performed an access and authentication procedure with respect to the outdoor network 240, and has been allocated with a public IP address in advance before the indoor network access terminal 205 accesses the Mobile WiMAX bridge 230.

Meanwhile, the Mobile WiMAX bridge 230 distinguishes the types of QoS using a user priority field in a WiFi layer of the indoor network with respect to signals transmitted from an access terminal. To this end, the Mobile WiMAX bridge 230 utilizes existing connections of the Mobile WiMAX of the outdoor network, or establishes a specific Mobile WiMAX connection for the outdoor network. For instance, when a flow shows that a user priority value is directed to a minimum time delay, the Mobile WiMAX bridge 230 establishes a specific Mobile WiMAX connection for each user, thereby ensuring the delay time to be set within a predetermined interval.

The operation for providing QoS by the Mobile WiMAX bridge 230 will now be described with reference to FIG. 6.

Figure 6:
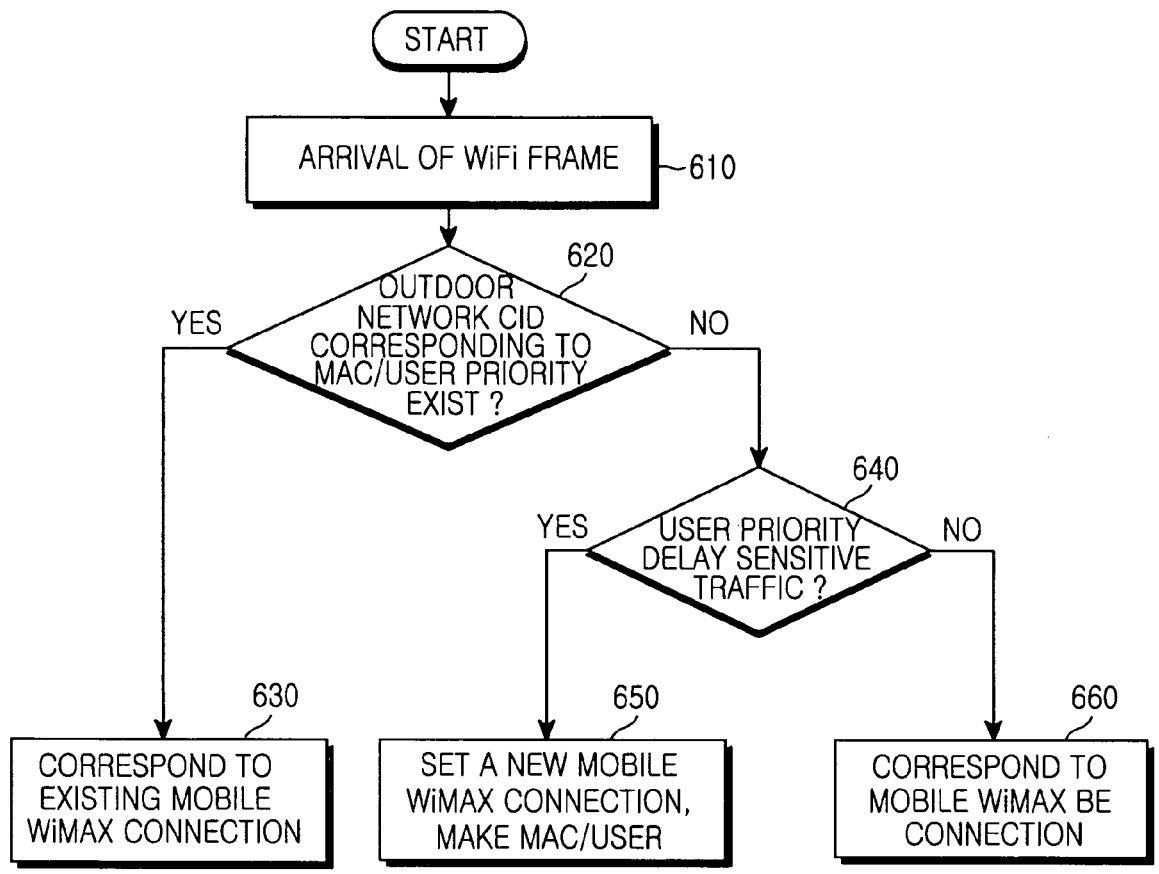
FIG. 6 is a flow chart illustrating operational steps for providing QoS by the Mobile WiMAX bridge shown in FIG. 2 according to an embodiment of the present invention.

FIG. 6 is a flow chart illustrating operational steps for providing QoS by the Mobile WiMAX bridge 230 shown in FIG. 2 according to an embodiment of the present invention.

When a WiFi frame arrives at the Mobile WiMAX bridge 230 in step 610, the Mobile WiMAX bridge 230 determines if the WiFi frame includes an outdoor network CID corresponding to a MAC/user priority in step 620. When it is determined in step 620 that the WiFi frame includes an outdoor network CID corresponding to a MAC/user priority, the Mobile WiMAX bridge 230 utilizes an existing Mobile WiMAX connection in step 630.

In contrast, if it is determined in step 620 that the WiFi frame does not include an outdoor network CID corresponding to a MAC/user priority, the Mobile WiMAX bridge 230 determines if the WiFi frame is traffic sensitive to a user priority delay in step 640. If it is determined in step 640 that the WiFi frame is the traffic sensitive to a user priority delay, the Mobile WiMAX bridge 230 establishes a new Mobile WiMAX connection and matches a MAC/user priority with a new CID in step 650. In contrast, If it is determined in step 640 that the WiFi frame is not traffic sensitive to a user priority delay, the Mobile WiMAX bridge 230 transmits the WiFi frame through the best effort (BE) connection of the Mobile WiMAX bridge 230 in step 660.

In brief, the Mobile WiMAX bridge determines if it is necessary to set a separate connection with respect to a user priority field. When it is necessary to set the separate connection, the Mobile WiMAX bridge establishes a separate connection for each indoor network access terminal, matches the user priority of the access terminal with a corresponding CID, and maintains the matching status. In contrast, with respect to a typical best effort (BE) traffic, the Mobile WiMAX bridge may transmit the BE traffic through an outdoor network Mobile WiMAX connection without distinction of access terminals in order to provide the corresponding service, or may transmit the BE traffic through a separate Mobile WiMAX connection for each access terminal.

The correspondence relation between user priorities and Mobile WiMAX connections are shown in Table 4 below.

TABLE 4

| User Priority | Meaning | Class # | Mobile WiMAX Connection |
|---|---|---|---|
| 111 | Network Critical (Network Control) | Class 7 | Delay 10 ms security Connection |
| 110 | Interactive Voice (<10 ms del) | Class 6 | |
| 101 | Interactive Multimedia (<100 ms del) | Class 5 | Delay 100 ms security Connection |
| 100 | Stream Multimedia (Controlled load) | Class 4 | |
| 011 | Business Critical (Excellent Effort) | Class 3 | |
| 010 | Standard (Spare) T | Class 2 | Best effort (BE) Connection |
| 001 | Background | Class 1 | |
| 000 | Best Effort (Default) | Class 0 | |

In Table 4, with respect to the traffic having the user priority of "111" or "110", a separate connection for securing a time delay of 10 ms is established and the traffic is mapped with the separate connection. With respect to the traffic having the user priority of "101", "100" or "011", a separate connection for securing a time delay of 100 ms is established and the traffic is mapped with the separate connection. With respect to the traffic having the user priority of "010", "001" or "000", a separate connection is not established and an existing BE connection is utilized to form a correspondence relation.

Figure 7:
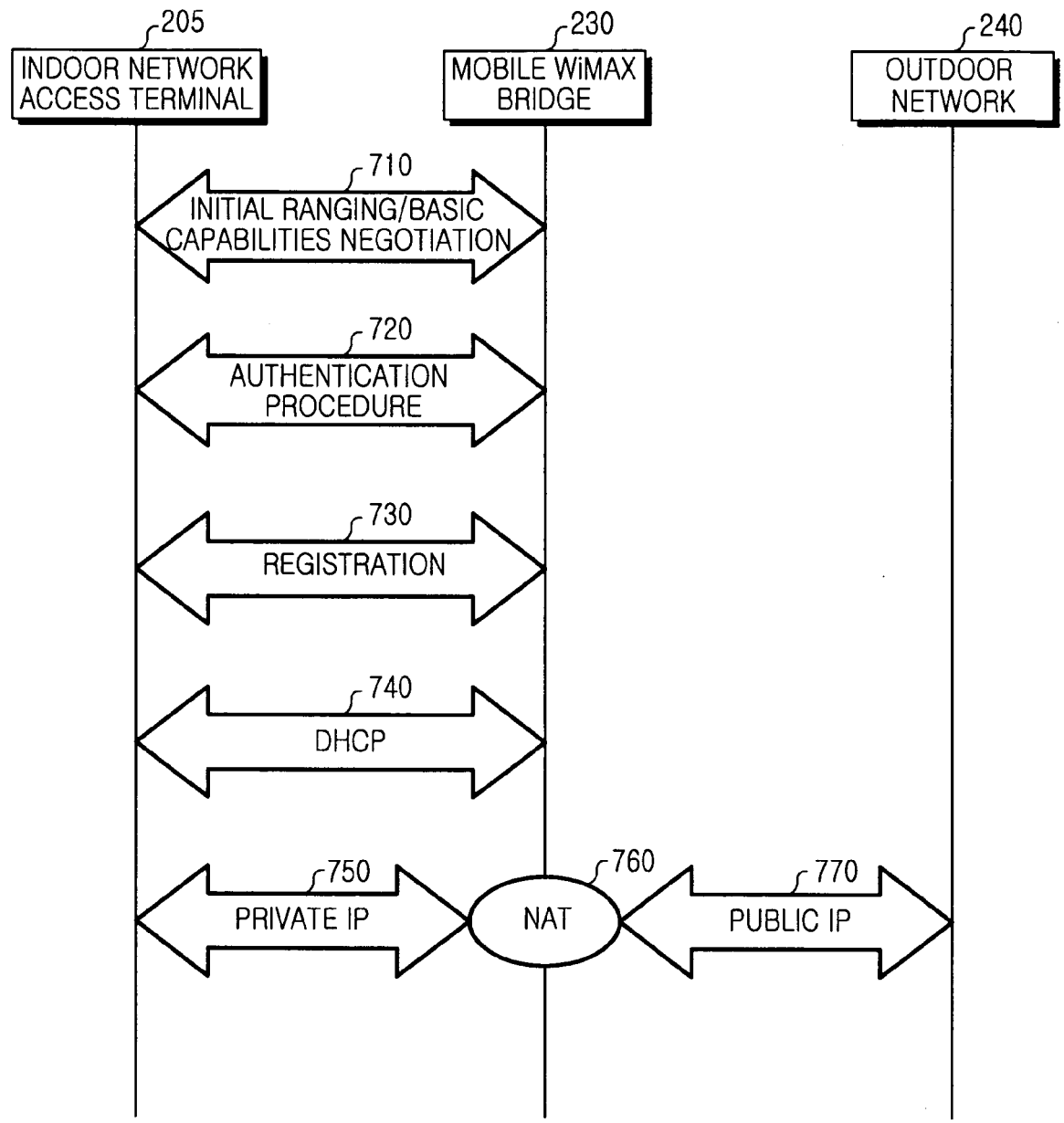
FIG. 7 is a signal flow diagram explaining the wireless access service operation of the Mobile WiMAX bridge shown in FIG. 2 when a Mobile WiMAX indoor private network is provided.

2. Indoor Network Constructed with Mobile WiMAX 2-1. Mobile WiMAX Indoor Private Network FIG. 7 is a signal flow diagram illustrating the wireless access service operation of the Mobile WiMAX bridge 230 shown in FIG. 2 when a Mobile WiMAX indoor private network is provided.

In step 710, the indoor network access terminal 205 performs an initial ranging corresponding to indoor network Mobile WiMAX information transmitted from the Mobile WiMAX bridge 230, and performs association in relation to a basic function. The indoor network access terminal 205 and the Mobile WiMAX bridge 230 perform respective authentication and registration procedures in steps 720 and 730, and creates a DHCP in step 740, so that the indoor network access terminal 205 acquires an IP address and required network configuration information from the Mobile WiMAX bridge 230. Then, the indoor network access terminal 205 attempts to access an outdoor network through the Mobile WiMAX bridge 230 by means of the private IP address in step 750, and the Mobile WiMAX bridge 230 performs a NAT function for translating the private IP address into a public IP address in step 760. After that, the Mobile WiMAX bridge 230 accesses the outdoor network 240 by using the translated public IP address in step 770. In this case, it is also assumed that the Mobile WiMAX bridge 230 has performed an access and authentication procedure with respect to the outdoor network 240 and has been allocated with a public IP address before the indoor network access terminal 205 accesses the Mobile WiMAX bridge 230.

Figure 8:
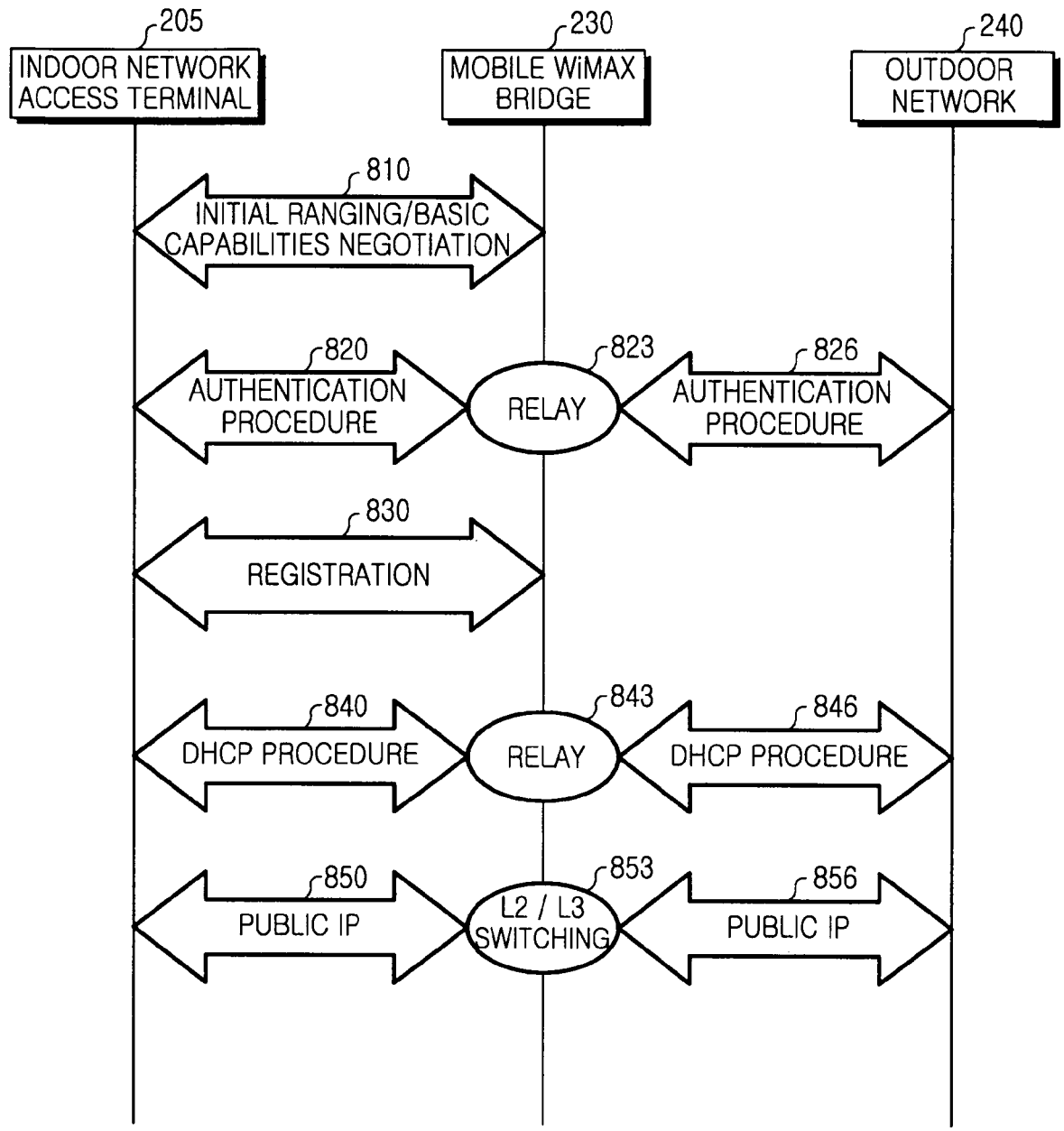
FIG. 8 is a flow diagram illustrating the wireless access service operation of the Mobile WiMAX bridge shown in FIG. 2 when a Mobile WiMAX indoor public network is provided.

FIG. 8 is a flow diagram illustrating the wireless access service operation of the Mobile WiMAX bridge 230 shown in FIG. 2 when a Mobile WiMAX indoor public network is provided.

In step 810, the indoor network access terminal 205 performs an initial ranging for an indoor network and performs association in relation to a basic function in step 810, and then performs an authentication procedure in step 820. In this case, the Mobile WiMAX bridge 230 transmits messages relating to the authentication procedure to relay message between the indoor network access terminal 205 and the outdoor network 240. In this case, a private key management (PKM) message is used for the Mobile WiMAX authentication. The Mobile WiMAX bridge 230 processes a PKM message transmitted from the indoor network access terminal 205, and relays an authentication procedure between an authentication server (not shown) and the indoor network access terminal 205 through a Mobile WiMAX outdoor network. The PKM message is transmitted through a basic CID, but the Mobile WiMAX bridge 230 does not use the basic CID for an outdoor network when transmitting the PKM message to the outdoor network. Since the basic CID for the outdoor network has already been used for the authentication of the Mobile WiMAX bridge 230 itself, the basic CID for the outdoor network cannot be used for the authentication of the indoor network access terminal 205. Also, an authentication procedure with respect to the outdoor network is performed to transmit a protocol message such as remote authentication dial-in user services (RADIUS) message or a Diameter message to an authentication server, so it is still unnecessary to use the basic CID. In order to achieve such processing, the Mobile WiMAX bridge 230 establishes a separate connection, which maintains security and decreases a delay, to use a CID of a corresponding connection.

After performing the authentication procedure as described above, the indoor network access terminal 205 performs a registration procedure with respect to the Mobile WiMAX bridge 230 in step 830.

In steps 840 to 846, the indoor network access terminal 205 acquires a public IP address and required network configuration information through a DHCP from the outdoor network 240. In this case, the Mobile WiMAX bridge 230 performs the function of relaying messages. After this, when the indoor network access terminal 205 attempts to access an outdoor network through the Mobile WiMAX bridge 230 by means of the public IP address in step 850, the Mobile WiMAX bridge 230 performs a L2/L3 switch function in step 853, and then performs access to an outdoor network 240 by using the public IP address in step 856. In this case, it is also assumed that the Mobile WiMAX bridge 230 has performed an access and authentication procedure with respect to the outdoor network 240 and the Mobile WiMAX bridge 230 has been allocated with the public IP address before the indoor network access terminal 205 accesses the Mobile WiMAX bridge 230.

Meanwhile, when an indoor network access terminal requests a Mobile WiMAX connection of the indoor network for QoS security, the Mobile WiMAX bridge 230 may utilize one of the existing Mobile WiMAX connections of the outdoor network, or may establish a separate Mobile WiMAX connection for the outdoor network. For instance, with respect to a connection set-up request defined to minimize a delay time, the Mobile WiMAX bridge 230 may set a separate Mobile WiMAX connection for each indoor network access terminal to allow a delay time to be set within a range of a predetermined interval.

Figure 9:
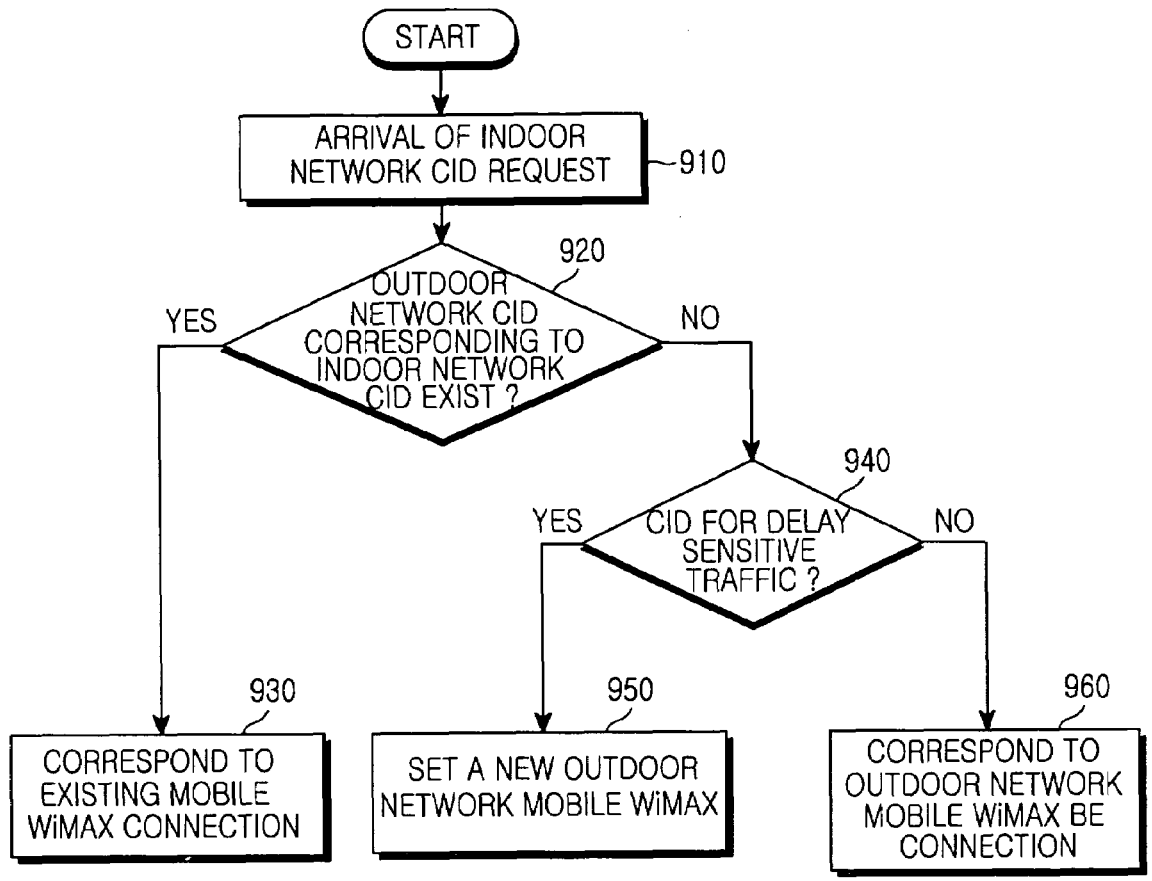
FIG. 9 is a flow chart illustrating operational steps for providing QoS by the Mobile WiMAX bridge shown in FIG. 2 according to another embodiment of the present invention.

FIG. 9 is a flow chart illustrating operational steps for providing QoS by the Mobile WiMAX bridge 230 shown in FIG. 2, according to an embodiment of the present invention.

When a WiFi frame arrives at the Mobile WiMAX bridge 230 in step 910, the Mobile WiMAX bridge 230 determines if the WiFi frame includes an outdoor network CID corresponding to an indoor network CID in step 920. If it is determined in step 920 that the WiFi frame includes an outdoor network CID corresponding to an indoor network CID, the Mobile WiMAX bridge 230 transmits the WiFi frame through an existing Mobile WiMAX connection in step 930.

In contrast, if it is determined in step 920 that the WiFi frame does not include an outdoor network CID corresponding to an indoor network CID, the Mobile WiMAX bridge 230 determines if the CID is qualified for a delay sensitive traffic in step 940. If it is determined in step 940 that the CID is qualified for a delay sensitive traffic, the Mobile WiMAX bridge 230 sets a new outdoor network Mobile WiMAX connection and adds a new outdoor network CID as a CID for a delay sensitive traffic in step 950. In contrast, if it is determined in step 940 that the CID is not qualified for a delay sensitive traffic, the Mobile WiMAX bridge 230 transmits the WiFi frame through the Mobile WiMAX BE connection in step 960.

In brief, the Mobile WiMAX bridge determines if it is necessary to establish a separate connection in relation to a user priority field. When it is necessary to set the separate connection, the Mobile WiMAX bridge establishes a separate connection for each indoor network access terminal, matches a relevant CID with the user priority of the indoor network access terminal, and maintains the matching status. In contrast, with respect to a typical BE traffic, the Mobile WiMAX bridge may transmit the BE traffic through an outdoor network Mobile WiMAX connection without distinction of indoor network access terminals in order to provide the corresponding service, or may transmit the BE traffic through a separate Mobile WiMAX connection for each indoor network access terminal.

In other words, with respect to an indoor network Mobile WiMAX access having specific QoS requirements, the Mobile WiMAX bridge determines if it is necessary to establish the separate outdoor network Mobile WiMAX connection. When it is necessary to establish a separate connection, the Mobile WiMAX bridge establishes the separate connection for each indoor network access terminal, and matches the corresponding outdoor network CID with the indoor network CID of a corresponding indoor network access terminal, and maintains the matching status. In contrast, with respect to a flow transmitted through an indoor network CID for a typical BE traffic, the Mobile WiMAX bridge may transmit the flow to an external network through one outdoor network Mobile WiMAX connection without distinction of indoor network access terminals, or may transmit the flow through a separate Mobile WiMAX connection for each indoor network access terminal.

As described above, the present invention provides a method for providing a WiFi or Mobile WiMAX access point for an indoor network through an outdoor Mobile WiMAX network regardless of whether an outdoor cable network has been installed. According to the present invention, a user can easily access a WiFi or Mobile WiMAX indoor network wherever an outdoor network Mobile WiMAX connection is provided.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for providing wireless access in a broadband wireless access system, the method comprising:
   authenticating an access terminal when an access of the access terminal located in a first network employing a first predetermined access scheme is detected;
   allocating a private Internet Protocol (IP) address to the authenticated access terminal; and
   translating the private IP address into a public IP address when an access of the access terminal through the private IP address is detected, and controlling the access terminal's access of a second network employing a second predetermined access scheme through the public IP address.

2. The method as claimed in claim 1, wherein the public IP address is allocated after achieving authentication in relation to the second network through the second predetermined access scheme.

3. The method as claimed in claim 2, further comprising:
   translating the public IP address into the private IP address when an access targeting the public IP address is detected from the second network;
   controlling that the second network accesses the access terminal through the private IP address.

4. The method as claimed in claim 1, wherein the first predetermined access scheme is a Wireless Fidelity (WiFi) private network access scheme, and the second predetermined access scheme is a Mobile Worldwide interoperability for Microwave Access (WiMAX) scheme.

5. The method as claimed in claim 1, wherein the first predetermined access scheme is a Mobile Worldwide interoperability for Microwave Access (WiMAX) private network access scheme, and the second predetermined access scheme is a Mobile WiMAX scheme.

6. A method for providing wireless access in a broadband wireless access system, the method comprising:
   controlling authentication of an access terminal by relaying information between the access terminal and a second network employing a second predetermined access scheme, when an access of the access terminal located in a first network employing a first predetermined access scheme is detected;
   controlling an allocation of the access a public Internet Protocol (IP) address from the second network terminal by relaying information between the authenticated access terminal and the second network; and
   switching the public IP address to enable the access terminal to access the second network when an access of the access terminal through the public IP address is detected.

7. The method as claimed in claim 6, wherein the public IP address is an IP address allocated after achieving authentication in relation to the second network through the second predetermined access scheme.

8. The method as claimed in claim 7, wherein the step of relaying information between the authenticated access terminal and the second network comprises:
   determining whether a second access scheme connection of the second network which corresponds to a Quality of Service (QoS) provided to the access terminal from the first network exists;
   matching a signal received from the access terminal with the second access scheme connection if it is determined that there is the existing second access scheme connection;
   determining whether the QoS is delay sensitive QoS if it is determined that the second access scheme connection is non existent;
   setting a new second access scheme connection corresponding to the delay sensitive QoS it is determined that the QoS is delay sensitive QoS, and matching the signal received from the access terminal with the new second access scheme connection; and
   matching the signal received from the access terminal with an existing second access scheme connection corresponding to a first predetermined QoS from among QoSs to be supported by the second network, when it is determined that the QoS is not delay sensitive QoS.

9. The method as claimed in claim 8, further comprising setting a new second access scheme connection corresponding to QoS provided to the access terminal from the first network if it is determined that the QoS is not the delay sensitive QoS, and matching the signal received from the access terminal with the new second access scheme connection.

10. The method as claimed in claim 8, wherein the first predetermined QoS is a best effort (BE) QoS.

11. The method as claimed in claim 6, wherein the first predetermined access scheme is a Wireless Fidelity (WiFi) public network access scheme, and the second predetermined access scheme is a Mobile Worldwide interoperability for Microwave Access (WiMAX) scheme.

12. The method as claimed in claim 6, wherein the first predetermined access scheme is a Mobile Worldwide interoperability for Microwave Access (WiMAX) private network access scheme, and the second predetermined access scheme is a Mobile WiMAX scheme.

13. An apparatus for providing wireless access in a broadband wireless access system which includes a first network employing a first predetermined access scheme and a second network employing a second predetermined access scheme, the apparatus comprising:
   a bridge for authenticating an access terminal when an access of the access terminal located in the first network is detected, allocating a private Internet Protocol (IP) address to the authenticated access terminal, translating the private IP address into a public IP address when an access of the access terminal through the private IP address is detected, and controlling the access terminal's access of the second network through the public IP address.

14. The apparatus as claimed in claim 13, wherein the public IP address is an IP address allocated after achieving authentication in relation to the second network through the second predetermined access scheme.

15. The apparatus as claimed in claim 14, wherein the bridge translates the public IP address into the private IP address when an access targeting the public IP address is detected from the second network, and controls that the second network accesses the access terminal through the private IP address.

16. The apparatus as claimed in claim 13, wherein the first predetermined access scheme is a Wireless Fidelity (WiFi) private network access scheme, and the second predetermined access scheme is a Mobile Worldwide interoperability for Microwave Access (WiMAX) scheme.

17. The apparatus as claimed in claim 13, wherein the first predetermined access scheme is a Mobile Worldwide interoperability for Microwave Access (WiMAX) private network access scheme, and the second predetermined access scheme is a Mobile WiMAX scheme.

18. An apparatus for providing wireless access in a broadband wireless access system which includes a first network employing a first predetermined access scheme and a second network employing a second predetermined access scheme, the apparatus comprising:
a bridge for controlling authentication of an access terminal by relaying information between the access terminal and the second network when an access of the access terminal located in the first network is detected, controlling a public Internet Protocol (IP) address from the second network to the access terminal by relaying information between the authenticated access terminal and the second network, and switching the public IP address to enable the access terminal to access the second network when an access of the access terminal through the public IP address is detected.

19. The apparatus as claimed in claim 18, wherein the public IP address is an IP address allocated after achieving authentication in relation to the second network through the second predetermined access scheme.

20. The apparatus as claimed in claim 19, wherein the bridge determines whether a second access scheme connection of the second network which corresponds to a Quality of Service (QoS) provided to the access terminal from the first network exists; matches a signal received from the access terminal with the existing second access scheme connection if it is determined that there is the existing second access scheme connection; determines whether the QoS is delay sensitive QoS if it is determined that second access scheme connection is nonexistent; sets a new second access scheme connection corresponding to the delay sensitive QoS if it is determined that the QoS is delay sensitive QoS, and matches the signal received from the access terminal with the new second access scheme connection; and matches the signal received from the access terminal with an existing second access scheme connection corresponding to a first predetermined QoS from among QoSs to be supported by the second network, if it is determined that the QoS is not delay sensitive QoS.

21. The apparatus as claimed in claim 20, wherein the bridge sets a new second access scheme connection corresponding to the QoS provided to the access terminal from the first network if it is determined that the QoS is not delay sensitive QoS, and matches the signal received from the access terminal with the new second access scheme connection.

22. The apparatus as claimed in claim 20, wherein the first predetermined QoS is a best effort (BE) QoS.

23. The apparatus as claimed in claim 18, wherein the first predetermined access scheme is a Wireless Fidelity (WiFi) public network access scheme, and the second predetermined access scheme is a Mobile Worldwide interoperability for Microwave Access (WiMAX) scheme.

24. The apparatus as claimed in claim 18, wherein the first predetermined access scheme is a Mobile Worldwide interoperability for Microwave Access (WiMAX) private network access scheme, and the second predetermined access scheme is a Mobile WiMAX scheme.

* * * * *